United States Patent [19]
McCoy et al.

[11] Patent Number: 5,460,386
[45] Date of Patent: Oct. 24, 1995

[54] SHAFT SEAL

[75] Inventors: Ronald G. McCoy, 113 Groveley Lane, West Heath, Birmingham, B31 4QA; Robert Davies, Birmingham, both of England

[73] Assignee: Ronald G. McCoy, England

[21] Appl. No.: 237,315

[22] Filed: Jul. 7, 1994

Related U.S. Application Data

[63] Continuation of Ser. No. 30,825, Mar. 12, 1993, abandoned.

[30] Foreign Application Priority Data

Mar. 14, 1992 [GB] United Kingdom ............... 9205659

[51] Int. Cl.⁶ .................................................. F16J 15/32
[52] U.S. Cl. .................... 277/9; 277/11; 277/152
[58] Field of Search .................... 277/9, 9.5, 10, 277/11, 147, 152

[56] References Cited

U.S. PATENT DOCUMENTS

| | | | |
|---|---|---|---|
| 2,405,120 | 8/1946 | Evans | 277/11 |
| 2,481,793 | 9/1949 | Stewart | 277/11 |
| 2,590,696 | 3/1952 | Gregoire | 277/47 |
| 2,816,784 | 12/1957 | Stucke | 277/152 |
| 3,264,885 | 8/1966 | Shellhouse et al. | 277/152 |
| 3,837,687 | 9/1974 | Leonard | 277/9 X |
| 4,191,384 | 3/1980 | Svedberg | 277/9.5 X |
| 4,218,813 | 8/1980 | Cather, Jr. | 277/11 X |
| 4,283,064 | 8/1981 | Staab et al. | 277/152 X |
| 4,433,846 | 2/1984 | Romero et al. | 277/9 |

FOREIGN PATENT DOCUMENTS

| | | | |
|---|---|---|---|
| 0477042 | 2/1972 | Japan | 277/9 |
| 0634848 | 3/1950 | United Kingdom | 277/9.5 |

*Primary Examiner*—Andres Kashnikow
*Assistant Examiner*—John L. Beres
*Attorney, Agent, or Firm*—Leydig, Voit & Mayer, Ltd.

[57] ABSTRACT

A radial lip seal comprises a rigid casing ring (10") and a rubbery sealing element (12") secured to the ring. An inner portion (13") of the element forms a sealing lip (14") for engagement with a shaft (S). Adjusting means, enabling variation of the bore of the seal, comprises an annular adjusting member (17") which moves axially upon rotation about the seal axis. The member comprises a mounting portion (18") and an inner portion forming an axially-projecting bearer (19") which abuts the sealing element adjacent to the lip (14"). Four camming tongues (22) project outwards from the casing ring to engage in slots (24) in the adjusting member (17"), the tongues being angled so as to cause controlled axial displacement of the member with rotation. A stop tongue (26) engaging in a gap (27) in the adjusting member limits the range of adjustment.

8 Claims, 3 Drawing Sheets

SHAFT SEAL

This is a continuation of application Ser. No. 08/030,825 filed on Mar. 12, 1993 now abandoned.

FIELD OF THE INVENTION

This invention relates to annular seals, for machine shafts and the like, which comprise a sealing lip which bears against the shaft surface to prevent passage of oil or other materials along the shaft surface.

BACKGROUND OF THE INVENTION

Commonly a sealing lip is provided by a pre-formed moulded component of the seal, often supported radially by a garter spring. However, seals are also known of a kind in which a rubbery element (for example, cut from sheet stock) becomes deformed by interacting components, upon assembly of the seal, to form a suitable lip. This invention can apply equally to both such forms of seal.

Ordinarily the bore (i.e. inside diameter) of a seal is determined upon assembly of the seal and is invariable in use. However, as well as providing potential for improved performance in use, there can also be benefits for installation and maintenance purposes in arranging for a seal to be of variable nominal bore; by the term "nominal bore" is meant here the bore of the seal as it is (or would be) when out of use, as opposed to its bore when in use which would be determined by the diameter of a shaft to which it was applied. In use of the seal, variation of the nominal bore enables variation of the lip/shaft interface characteristics for maximum efficiency of operation. During installation and maintenance, the ability to increase the bore, and so slacken the seal's grip on a shaft on which it is engaged (or to be engaged) can be of benefit in facilitating movement of the seal along the shaft and avoiding damage to the lip.

SUMMARY OF THE INVENTION

The invention provides, in one of its aspects, a radial lip seal comprising a rigid casing ring and a resiliently displaceable lip-forming portion which projects radially inwardly beyond the casing ring to form a sealing lip arranged to engage the surface of a shaft, characterised in that adjusting means of the seal comprises lip-displacing means which is arranged to bear against the lip-forming portion and is movable axially relative to the casing ring for displacement of the lip to vary the bore of the seal.

The lip-displacing means can comprise an adjustment member in the form of a ring having a mounting portion and flange-like portion forming a bearer which projects axially from an inner periphery of the mounting portion to engage the lip-forming portion.

The lip-forming portion of the seal would ordinarily comprise a radially inner portion of a rubbery sealing element of which an outer portion is secured to the casing ring. In one suitable construction the sealing element is formed from flat sheet stock of a flexible resilient material, the inner portion of the element being clamped to the casing ring.

Axial positioning of the lip-displacing means may be achieved by the interpositioning of camming elements between the casing ring and the adjustment ring which enable adjustment by rotation of the adjustment ring. In one preferred arrangement, a plurality of camming tongues project from the casing ring and extend through slots in the mounting portion of the adjustment ring, the tongues being inclined to the axial direction in order to cause controlled axial displacement of the ring upon rotation of the ring. The tongues may be turned outwards from the material of an inner margin of the casing ring. A stop tongue may also be turned outwards from the margin and engage in a circumferentially extending gap in the mounting portion of the adjustment ring to limit the available rotation of the ring.

There now follows a description, to be read with reference to the accompanying drawings, of three shaft seals which illustrate the invention by way of example.

DETAILED DESCRIPTION OF THE PREFERRED EMBODIMENT

Figure 1:
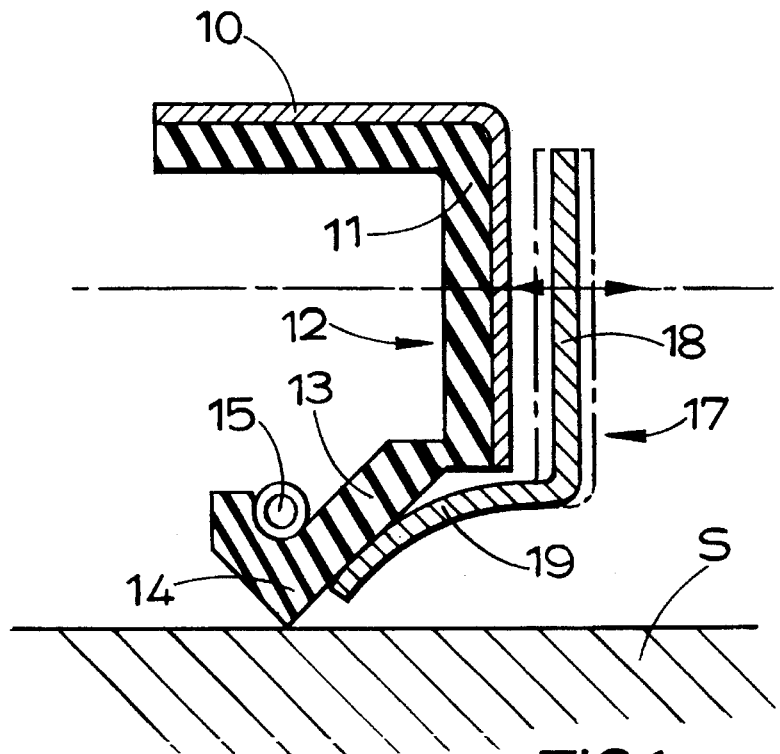
FIG. 1 is a diagrammatic sectional view in an axial plane through a first seal, being a first embodiment of the invention.

With reference to FIG. 1, an oil seal of the kind which can be referred to as a radial lip seal is shown mounted in use on a rotary shaft S. The seal comprises a rigid steel casing ring 10, of angle form in cross-section, to an inside surface of which is bonded a correspondingly shaped mounting portion 11 of a pre-formed moulded annular sealing element 12 of an elastomeric, rubbery, material. A radially inner portion 13 of the element 12 projects axially forwards and radially inwards from an inner periphery of the casing ring 10, and forms a continuous sealing lip 14; the lip determines the inside diameter (bore) of the seal and engages the shaft surface all around the shaft at a position spaced axially forwards from the connection of the inner portion 13 to the casing ring. In a conventional manner, a garter spring 15 is retained within a groove in the sealing element to resist expansion of the lip and maintain it in a resilient manner against the shaft surface. Such a construction of lip seal is well known.

Adjusting means of the seal comprises lip-displacing means in the form of an adjustment ring 17. The ring is suitably secured outside the casing ring 10 to enable it to be moved axially towards and away from the casing ring. In a simple form, the ring is secured to the casing ring by means of three adjustment screws which are disposed uniformly about the seal axis. The adjustment ring comprises a radially flat outer mounting portion 18, by means of which it is secured to the casing ring 10, and a radially inwardly curving portion forming a bearer 19 which projects axially forwards from the inner periphery of the mounting portion to abut a rear surface of the sealing element 12 adjacent to the lip 14. By movement of the adjustment ring 17 towards the casing ring 10, and so towards the sealing element 12, the lip 14 can be caused to expand (i.e. increase in diameter) against the action of the garter spring 15. Upon retracting the adjustment ring from the casing ring 10, the lip is permitted to contract under the action of the garter spring. The seal is so of variable inside diameter.

Figure 2:
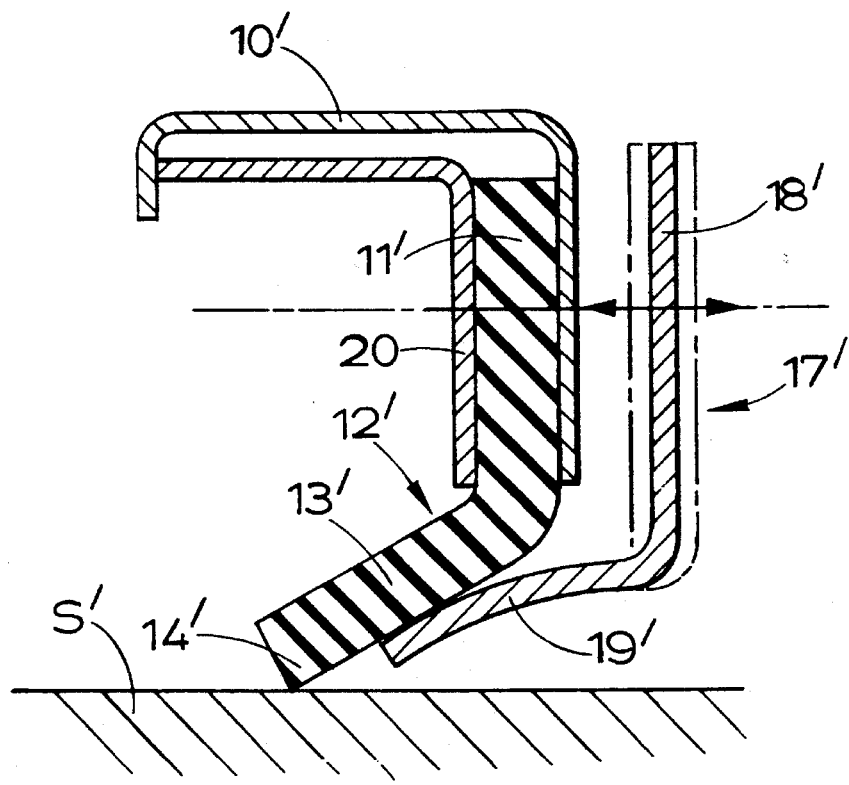
FIG. 2 is a similar view of a second seal, being a second embodiment of the invention.

The seal illustrated by FIG. 2 is of a similarly adjustable construction, comprising a rigid casing ring 10' to which a mounting portion 11' of an annular elastomeric sealing element 12' is secured, and comprising an axially-movable adjustment ring 17' having a mounting portion 18' and a projecting bearer 19'. The annular sealing element 12' is cut from flat sheet stock of an elastomeric material, a radially outer portion 11' being clamped as a mounting portion between an inside face of the casing ring 10' and an angle-form clamping ring 20. An inner portion 13' of the sealing element is held deflected axially forwardly from the plane of the outer portion 11' by the bearer 19', a radially-displaceable shaft-engaging lip 14' so being provided. The diameter of the lip can be varied by adjustment of the axial position of the adjustment ring 17'.

A third construction of seal is shown in FIGS. 3,4,5 and 6. This seal is similar to the second seal in that a sealing lip 14" is formed by an axially-deflected inner portion 13" of an annular sealing element 12" formed from flat sheet stock of an elastomeric material; an outer portion 11" of the sheet is held clamped between a clamping ring 20" and an inside face of a rigid casing ring 10" of the seal.

Adjusting means of the third seal is similar in basic form to that of the first and second seals, in that it comprises an axially-movable adjustment ring 17" which is secured to the casing ring 10" and comprises a radially flat annular mounting portion 18" and a bearer 19" which projects axially forwards from a radially inner periphery of the mounting portion. The bearer, at a smoothly rounded tip portion 21, abuts a rear surface of the sealing element adjacent to the lip 14" to maintain the lip in adjusted position.

Figure 6:
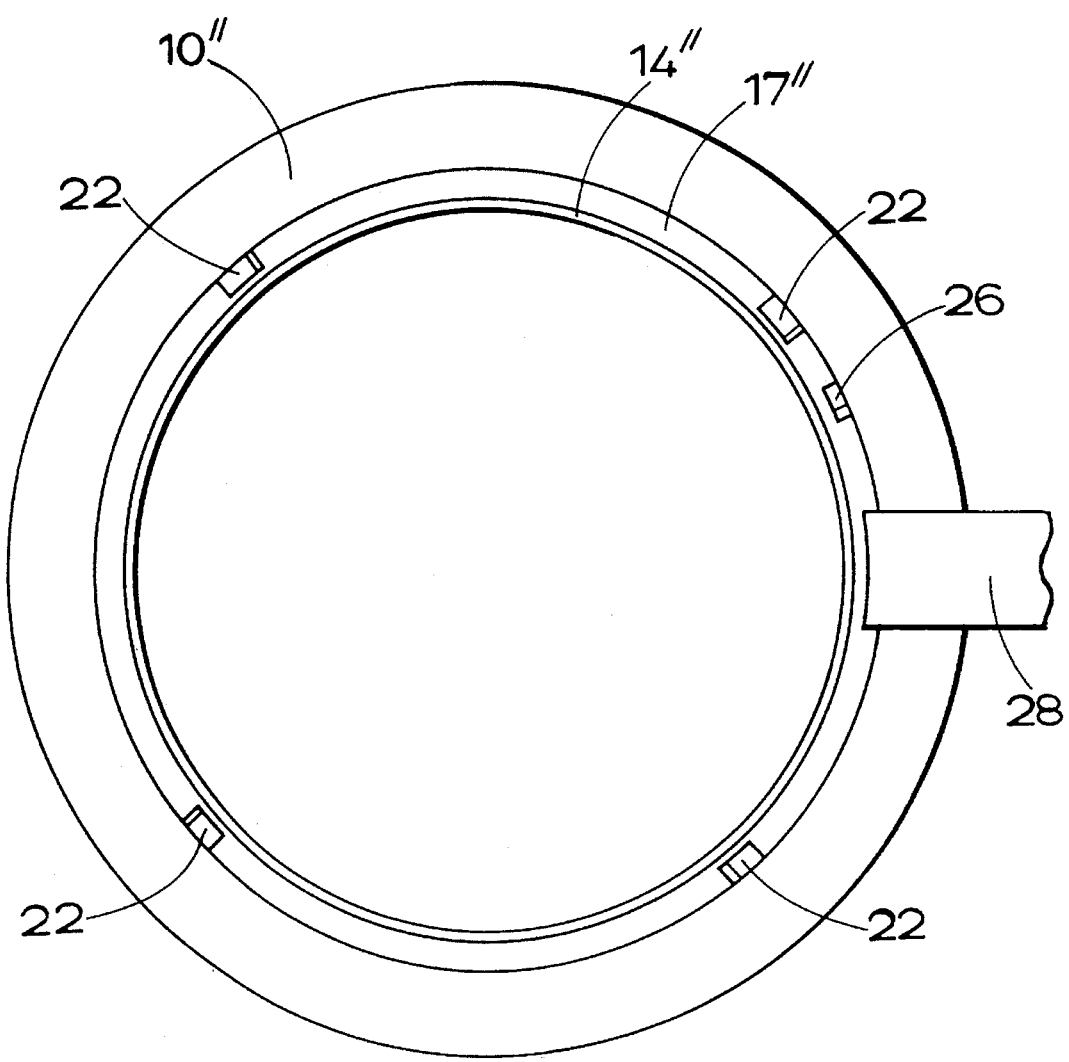
FIG. 6 is an axial view of the third seal in the direction of arrow 'A' in FIG. 3.

In this third seal, four flat camming tongues 22 are turned outwards/rearwards from the material of a radially inner margin 23 of the casing ring at an angle of 45° to the axial direction (see FIGS. 3 and 4); the four tongues are all similarly directed and are uniformly disposed about the axis of the seal (see FIG. 6). The mounting portion 18" of the adjustment ring 17" has four slots 24 formed in it through which the four tongues 22 extend with clearance, opposed side faces of the slots (on opposite sides of the tongues) being angled similarly in order to be parallel with flat side faces 25 of the tongues.

Figure 3:
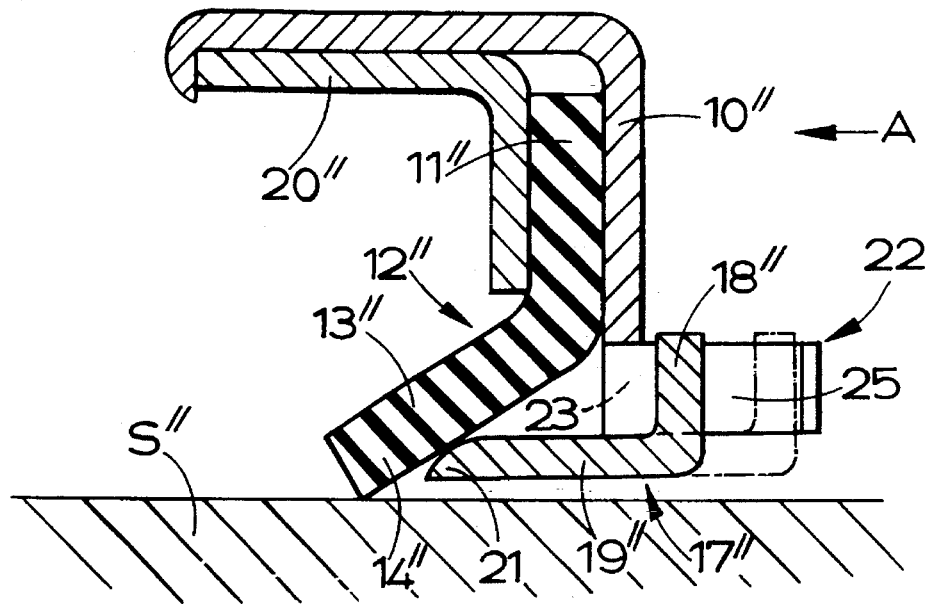
FIG. 3 is a section on line III—III of FIG. 4 to show a similar view of a third seal, being a third embodiment of the invention.
Figure 4:
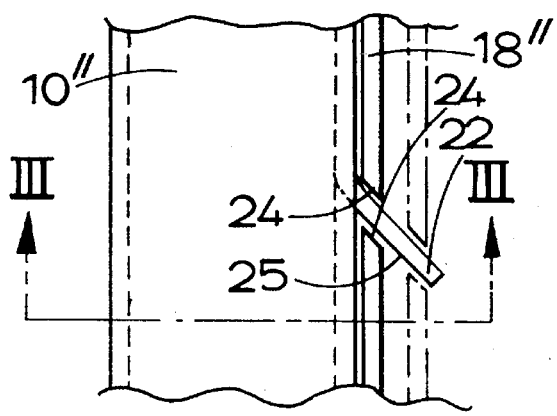
FIG. 4 is a scrap view of the third seal, in a first radial inwards direction.
Figure 5:
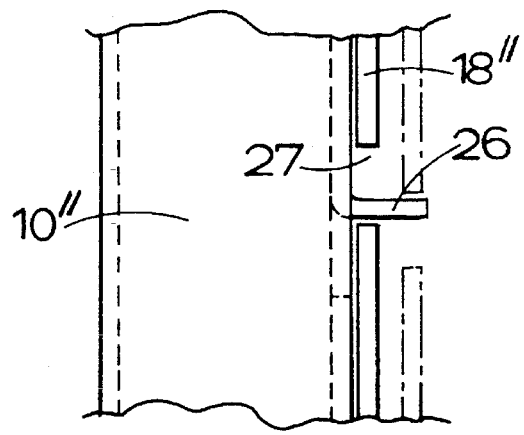
FIG. 5 is a scrap view of the third seal taken in a second radial inwards direction.

As a consequence of the inclination of the camming tongues 22 to the axis of the seal, the adjustment ring 17" can be rotated to vary its axial position relative to the casing ring 10"; in FIGS. 3,4 and 5 the adjustment ring is shown in full line in a fully forwards position, and a fully rearward position of the ring is shown in broken line. As with the first and second seals, adjustment of the axial position of the adjustment ring results in variation of the bore of the seal at the lip 14" (or variation in the pressure with which the lip engages the surface of the shaft S", in use) owing to the engagement of the bearer 19" with the sealing element.

To limit the range of adjustment, and to prevent possible disengagement of the adjustment ring, a stop tongue 26 is turned out from the margin 23 of the casing ring to act as a stop (see FIGS. 5 and 6). The stop tongue is turned out at 90° (so as to be parallel to the seal axis) and passes through a gap 27 in the adjustment ring. The gap 27 is of a suitable circumferential length to determine the required limits of rotation of the adjustment ring.

Any suitable mechanism for rotation of the adjustment ring 17" could be provided, but in the third seal as illustrated (FIG. 6) a torque arm 28 is shown secured to the adjustment ring and projecting radially from the ring, the arm leading to suitable mechanism for controlling its required movements.

In other seals according to the invention, camming elements other than such tongues could be employed. For example, discrete dimples could be raised from the casing ring, or an adjunct thereto, to engage with similar dimples raised from an opposing face of the adjustment ring.

In use of any of the three seals described, lip/shaft interface characteristics can be varied by variation of the radial lip force applied to the shaft, through adjustment of the nominal bore of the seal by means of the adjustment ring. This can enable the seal to be used with maximum efficiency, avoiding unnecessary heat generation and wear of the seal lip.

During installation of the seal, the seal may be adjusted to maximum bore to enable it to be slipped easily over the shaft without risking damage to the seal lip. Likewise, the seal can be enabled to be moved easily along the shaft during maintenance operations.

We claim:

1. A radial lip seal for sealing around a rotary machine shaft, the seal comprising a rigid casing ring presenting an internal flange forming an opening to receive the shaft, an annular sealing element secured to said flange and comprising a resiliently displaceable lip-forming portion extending radially inwardly beyond said flange to form a sealing lip for engagement with the shaft surface, said lip defining a shaft receiving bore, seal lip adjusting means comprising a lip-displacing adjustment ring comprising an inner portion which projects through said opening to bear axially against the lip-forming portion at a point in radially spaced relation to an outer periphery of said shaft for establishing the size of said shaft receiving bore and a desired sealing pressure of said sealing lip against said shaft, and said adjustment ring being movable axially relative to the casing ring for displacement of the lip to vary the bore of the seal and the sealing pressure of said lip against said shaft.

2. A seal according to claim 1 in which the sealing element is formed from flat sheet stock of a flexible resilient material, an inner portion of the element being clamped to the said flange.

3. A seal according to claim 1 in which axial positioning of the adjustment ring is varied by rotation of the adjustment ring.

4. A radial lip seal for sealing around a rotary machine shaft, the seal comprising a rigid casing ring presenting an internal flange forming an opening to receive the shaft, an annular sealing element secured to said flange and comprising a resiliently displaceable lip-forming portion extending radially inwardly beyond said flange to form a sealing lip for engagement with the shaft surface, and seal lip adjusting means comprising a lip-displacing adjustment ring comprising an inner portion which projects through said opening to bear axially against the lip forming portion, said adjustment ring being movable axially relative to the casing ring for displacement of the lip to vary the bore of the seal, said adjusting means comprising positioning means which maintains said adjustment ring in selected axially-adjusted position bearing against said lip-forming portion of said sealing element, and said positioning means comprising a plurality of camming elements distributed about the seal axis and interposed between the casing ring and the adjustment ring to determine the axial positioning of the adjustment ring relative to the casing ring.

5. A seal according to claim 4 in which said camming elements are in the form of tongues which project from the casing ring and extend through slots in a mounting portion of the adjustment ring, the tongues being inclined to the axial direction in order to cause controlled axial displacement of the adjustment ring upon rotation.

6. A seal according to claim 5 in which the tongues are turned outwards from the material of an inner margin of the casing ring.

7. A seal according to claim 6 in which a stop tongue is turned outwards from the material of the margin of the casing ring and engages in a circumferentially-extending gap in the mounting portion of the adjustment ring to limit the available rotation of the adjustment ring.

8. A radial lip seal for sealing around a rotary machine shaft, the seal comprising a rigid casing ring presenting an internal flange forming an opening to receive the shaft, an annular sealing element secured to said flange and comprising a resiliently displaceable lip-forming portion extending radially inwardly beyond said flange to form a sealing lip for engagement with the shaft surface, and seal lip adjusting means comprising a lip-displacing adjustment ring comprising an inner portion which projects through said opening to bear axially against the lip-forming portion, said adjustment ring being movable axially relative to the casing ring for displacement of the lip to vary the bore of the seal, said adjusting means being axially positionable in response to rotation of the adjusting ring, said adjusting means comprising positioning means which maintains said adjustment ring in selected axially-adjusted position bearing against said lip-forming portion of said sealing element, and adjusting means comprising a torque arm secured to the adjustment ring for enabling controlled rotation of the ring.

* * * * *